Nov. 13, 1934.  J. PETERS  1,980,762
BUCK RAKE OR HAY SWEEP
Filed April 25, 1934  2 Sheets-Sheet 2
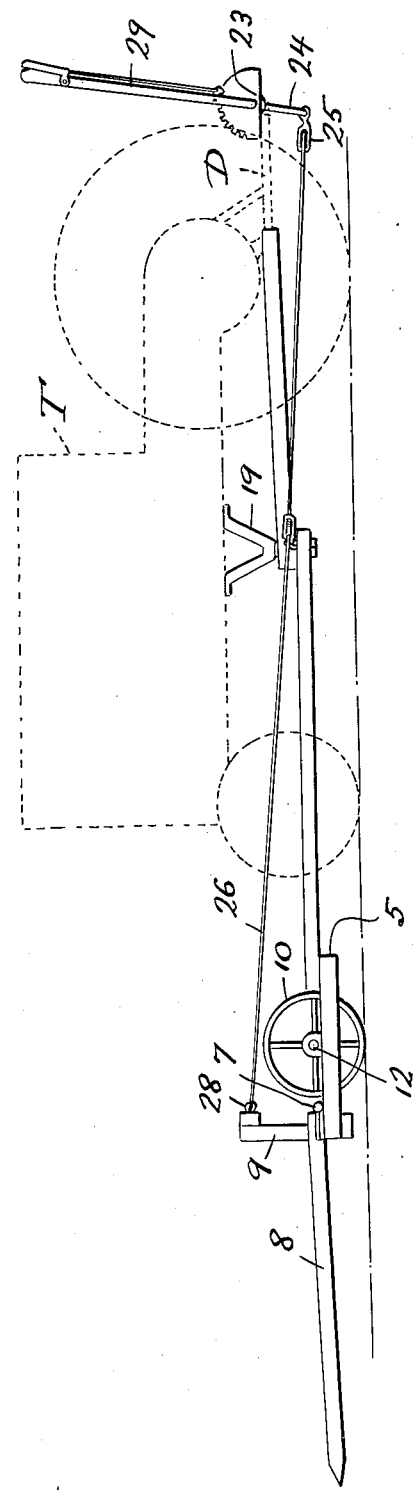
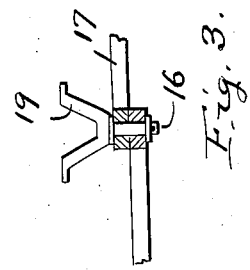
Inventor
Joseph Peters
By Clarence A. O'Brien
Attorney Patented Nov. 13, 1934

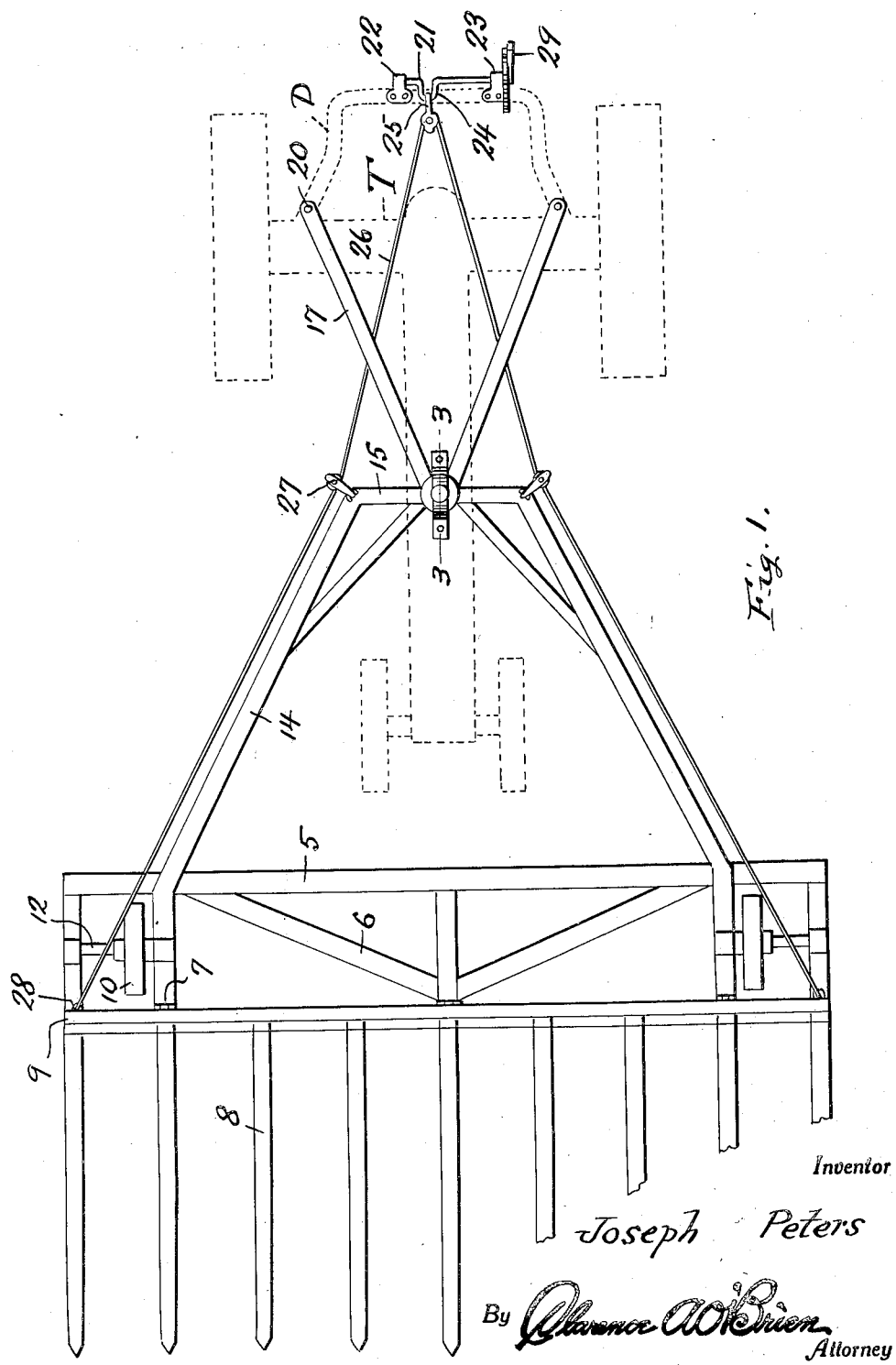

1,980,762

UNITED STATES PATENT OFFICE 1,980,762

BUCK RAKE OR HAY SWEEP

Joseph Peters, O'Neill, Nebr.

Application April 25, 1934, Serial No. 722,365

1 Claim. (Cl. 56—27)

The present invention relates to buck rakes or hay sweeps and the like and more particularly to a device of this character for use in conjunction with a tractor.

One of the objects of the invention resides in the provision of a structure that may be readily attached to a tractor in such a manner that the rake may be manipulated in such a manner that the rake or sweep may be manipulated in an efficient and reliable manner.

Another very important object of the invention resides in the provision of a device of this nature which is comparatively simple in its construction, inexpensive to manufacture, strong and durable and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a top plan view of a rake or sweep embodying the features of my invention.

Figure 2 is a side elevation thereof.

Figure 3 is a detail sectional view taken substantially on the line 3—3 of Figure 1.

Referring to the drawings in detail it will be seen that numeral 5 denotes a rectangular frame with suitable bracing structure 6. On the front longitudinal member of the frame is hingedly mounted as at 7 a rake 8. A frame 9 rises from the rake 8 adjacent the hinges 7 and by swinging the frame 9, of course, the rake 8 may be raised or lowered. Wheels 10 are journalled on axles 12 mounted in the ends of the frame 5. A frame 14 is fixed to the frame 5 and extends rearwardly, the side portions of said frame 14 converging rearwardly and merging into a cross member 15, the center of which is rockable on a pin 16. A V-shaped frame 17 has an opening in the apex thereof through which the pin 16 extends. A bracket 19 rises from the pin 16 and is fixed under the tractor T. The ends of the V-shaped frame 17 are secured as at 20 to the draw bar D of the tractor. A shaft 21 is journalled in brackets 22 and 23 on the rear of the draw bar D and has a crank portion 24 with which is engaged a clevis 25 of the pulley type. A cable 26 has an intermediate portion engaged in the clevis and trained over pulleys 27 on the rear corners of the frame 14 and secured to the frame 9 as at 28 at the upper corners thereof. A lever 29 is fixed to the shaft 21 and by swinging this lever 29 the rake may be raised and lowered.

It is thought that the construction, operation, and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described including an elongated frame adapted to be disposed forwardly and transversely of a tractor, wheels for supporting the end portions of the frame, a rake hingedly connected to the forward rail of the frame, a second frame extending rearwardly from the first mentioned frame, and means for swingably engaging the rear of the second mentioned frame under a tractor, a third frame secured to and upstanding from the rake, and means for swinging the third frame for raising and lowering the rake, a fourth frame rockably engaged under the tractor by the same means as the second frame and securely anchored to the tractor at its rear end.

JOSEPH PETERS.